US006939235B2

(12) United States Patent
Bruckmann

(10) Patent No.: US 6,939,235 B2
(45) Date of Patent: Sep. 6, 2005

(54) ASSEMBLY OF A DRIVE SHAFT WITH THE CUTTING HEAD HUB OF A SUBMERSIBLE GRANULATOR

(75) Inventor: Theodor Bruckmann, Xanten (DE)

(73) Assignee: BKG Bruckmann & Kreyenborg Granuliertechnik GmbH, Munster (DE)

( * ) Notice: Subject to any disclaimer, the term of this patent is extended or adjusted under 35 U.S.C. 154(b) by 15 days.

(21) Appl. No.: 10/380,227

(22) PCT Filed: Jul. 13, 2001

(86) PCT No.: PCT/DE01/02689

§ 371 (c)(1), (2), (4) Date: Mar. 11, 2003

(87) PCT Pub. No.: WO02/40236

PCT Pub. Date: May 23, 2002

(65) Prior Publication Data

US 2003/0178231 A1 Sep. 25, 2003

(30) Foreign Application Priority Data

Nov. 17, 2000 (DE) .......................................... 100 56 991

(51) Int. Cl.[7] .................................................. F16D 3/44
(52) U.S. Cl. ........................................................ 464/159
(58) Field of Search ................................. 464/159, 158, 464/154, 150, 18, 19; 175/320

(56) References Cited

U.S. PATENT DOCUMENTS 1,335,913 A * 4/1920 Orbom ....................... 464/159
3,196,487 A 7/1965 Snelling
3,199,311 A * 8/1965 Hill ............................ 464/159
3,266,090 A 8/1966 Gosney
3,427,825 A * 2/1969 Willy et al. ................. 464/159
4,003,218 A 1/1977 Filderman
4,305,596 A * 12/1981 Unterstrasser .............. 277/634
4,969,371 A 11/1990 Allen
5,688,114 A * 11/1997 Millington et al. ........... 418/48

FOREIGN PATENT DOCUMENTS

DE 196 42 389 4/1997
EP 0 462 705 12/1991
EP 0 565 119 10/1993

* cited by examiner

*Primary Examiner*—David Bagnell
*Assistant Examiner*—K. Thompson
(74) *Attorney, Agent, or Firm*—Merchant & Gould P.C.

(57) ABSTRACT

The invention relates to the assembly of a drive shaft with the cutting head hub of a submersible granulator. Said assembly comprises a connector hood which can be fixed to the drive shaft in such a way that it remains free to move. The connector hood is provided with threading for screwing the cutting head hub onto the drive shaft, said drive shaft being supported on a spherical extremity situated on the inside of the connector hood, and a cogged crown with inner-sided cogs is placed on the cutting head side of the drive shaft. The connector hood has inner-sided cogs which interlace with the cogs on the outer side of the cogged crown. The outer surface of each cog on the cogged crown is convex.

5 Claims, 2 Drawing Sheets

PRIOR ART

ASSEMBLY OF A DRIVE SHAFT WITH THE CUTTING HEAD HUB OF A SUBMERSIBLE GRANULATOR

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to an assembly of a drive shaft with the cutting head hub of a submersible granulator according to the preamble of the main claim.

2. Description of Related Art

Self-aligning cutting head hubs for the assembly of the cutting head hub with a drive shaft are known, whereby the self-aligning hub enables the knife blades of the cutting head disc to assume an optimal parallel arrangement with respect to the counteredges or to the extrusion-nozzle plates.

In the arrangement according to DE 196 42 389 A1, inserted into the cutting head disc is a hub that can adjust itself with respect to the plane of the cutting head disc, so that the possibility thereby exists of the plane of the cutting disc head assuming a slightly angular position relative to the axis of the drive shaft.

A disadvantage of this known construction is the fact that the hub is integrated into the cutting disc head, so that for each (possibly differently sized) cutting head the additional fitting of the costly hub and of the components that enable its movement is necessary, that is to say, the cutting head disc represents a relatively expensive, multi-part component.

In order to avoid this disadvantage, in an arrangement (FIG. 3) that has become generally known in practice, it is proposed that a connection hood 25 be applied to the actual drive shaft 1, which hood displays at its outermost end an outer thread that can engage an inner thread provided on the cutting head disc, so that thereby a simple fastening of the cutting head disc to the connection hood 25 is possible.

The connection hood 25 itself is supported in a pivoting manner and transmits the contact pressure of the drive shaft 1, via a spherical end 30 provided on the drive shaft 1, to a corresponding bearing on the inside of the connection hood 25. The drive shaft is driven in a rotating manner and entrains the connection hood 25 in the direction of rotation by means a groove-ball connection 27/28.

Due to this drive connection between the drive shaft and the connection hood, this known construction possesses the disadvantage that large forces must here be transmitted by the two balls. The processing of the bearing for the spherical ends in the connection hood 25 is expensive; in addition, at the spot where the greatest forces are transmitted, there exists for technical reasons a turned recess 29 where no force can be transmitted, and over time a troublesome edge forms on the ball.

BRIEF SUMMARY OF THE INVENTION

The invention is based on the task of creating a self-aligning connection between drive shaft and cutting head disc that is capable of transmitting large forces without difficulty, these forces being both large rotational forces for the driving of the cutting head disc and large forces of pressure for applying the cutting head disc to the counter-edge or to the extrusion-nozzle plate.

This task, on which the invention is based, is accomplished through the teaching of the main claim.

Advantageous configurations of the invention are explained in the dependent claims.

Expressed in other words, it is proposed that, in contrast to the prior art as it is known from DE 196 42 389 A1, the cutting head disc need display merely an inner thread that engages an outer thread on the connection hood, so that the cutting head disc, irrespective of the rest of its design, need display only one thread for the attachment to the drive shaft, which thread engages all of the outer threads on the connection hood of the drive shaft. Thus, compared to this prior art, a considerable cost advantage is achieved.

In comparison to the prior art according to FIG. 3 that is known in practice, the arrangement according to the invention has the advantage that the force transmission between drive shaft and connection hood is substantially improved, since now a plurality of cogs are engaged with each other, yet in spite of this the desired pivoting movement of the connection hood relative to the drive shaft and relative to the plane of the cutting head disc is possible.

The entrainment connection between drive shaft and connection hood is shifted very far toward the extreme end of the connection hood, whereby a better conduction of force among drive shaft, connection hood, and cutting head disc is achieved.

The structure according to the invention creates an advantageous shifting of the pivot point or of the center of rotation for the tipping motion and of the point for the torque transmission in the direction toward the cutting head disc.

In addition to the forming of the outer cog surface of each cog in a convexly curved manner, according to the invention the cog flanks of the cogs can also be formed as convexly curved around an axis running parallel to the longitudinal axis of the drive shaft, i.e. each cog is in itself broader at its middle than at the ends.

Through the provision of a pressure-transmission plate that is replaceable and well-machinable in its non-attached state, a wear component is created that can be easily replaced at any time upon the occurrence of even the slightest wear. The ball that works in conjunction with the pressure-transmission plate can also consist of carbide, and since the ball is designed as a separate spherical body, it too is replaceable and can be quickly exchanged when wear occurs.

BRIEF DESCRIPTION OF THE SEVERAL VIEWS OF THE DRAWINGS

In the following, an embodiment example of the invention is explained with the aid of the drawings. These show.

DETAILED DESCRIPTION OF THE INVENTION

Figure 1:
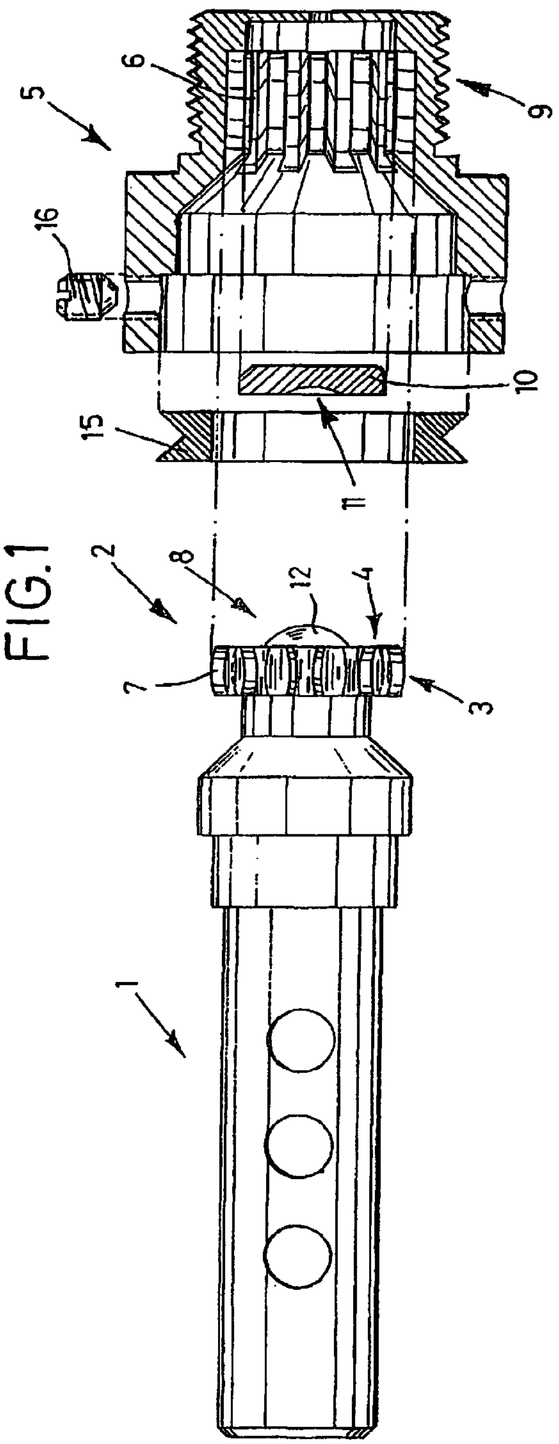
FIG. 1: the drive shaft with connection hood to be joined to the latter, shown pulled apart

In the drawings, 1 indicates a drive shaft, which at its end 2 pointing toward the cutting edge head to be attached (not shown in the drawing) displays outer cogs 3 that are formed by a cogged crown 4, which displays individual cogs 7. The outer cog surface of each cog 7 is here designed in a convexly-curved manner, as can readily be seen from the drawing, and in the represented embodiment example the cog flanks of the cogs 7 are also convexly curved around an axis running parallel to the longitudinal axis of the drive shaft; in other words, each cog 7 is in itself broader at its center than at the ends. The convex curving of the outer cog surfaces is essential, while the convex curving of the cog flank surfaces is not of such great significance and can be dispensed with, for example for reasons relating to finishing technology.

Figure 2:
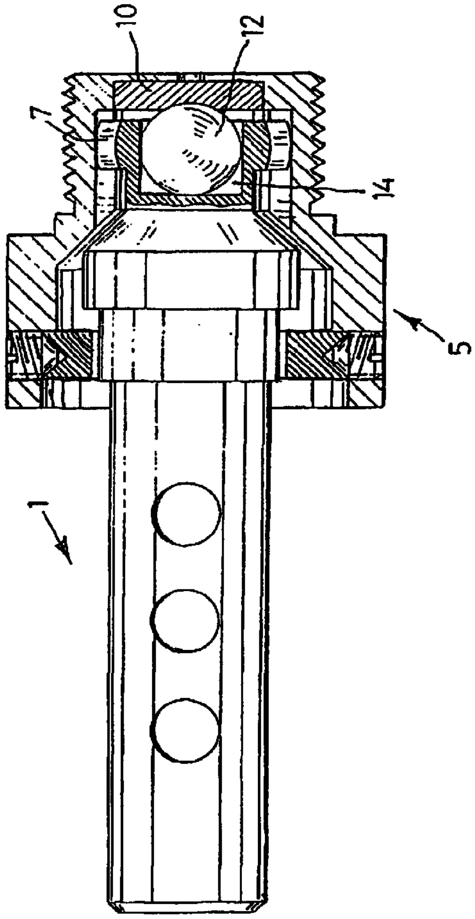
FIG. 2: the drive shaft with connection hood in the assembled state
Figure 3:
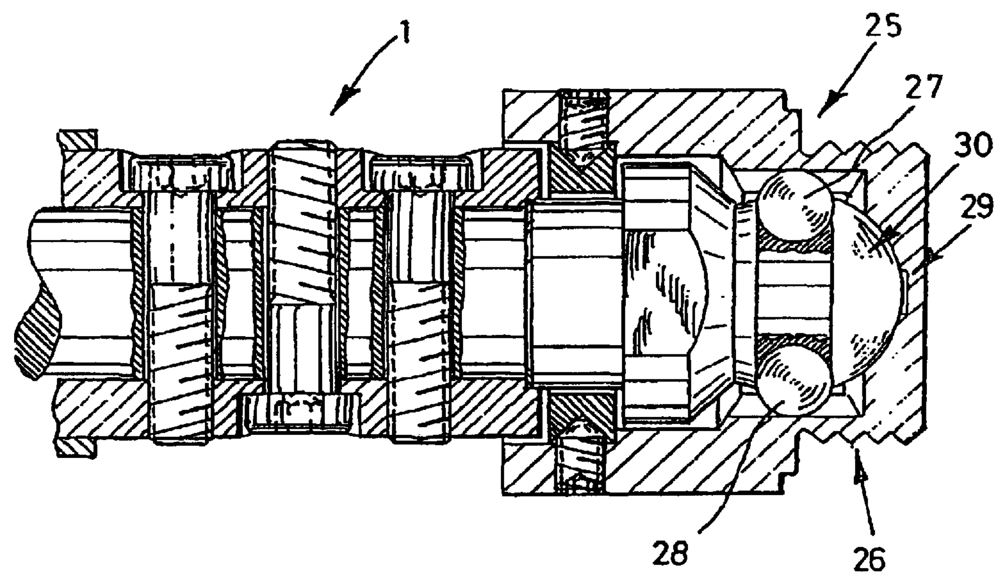
FIG. 3: the drive shaft with connection hood in a structure belonging to the prior art.

The drive shaft 1 displays, at the end 2 pointed toward the cutting head disc, a ball end 8; this ball end 8, as FIG. 2 clearly shows, is formed by a separate ball 12 that is arranged in a corresponding recess on the end of the drive shaft 1. In order to prevent a falling out of the ball when the apparatus is assembled, the ball can be cemented into its receptacle space, which is visible in FIG. 2.

Provided as a second separate component is a connection hood 5, which at its region coming into contact with the cutting head disc displays a connection thread 9. In the interior this cutting head disc [sic] displays inner cogs 6 that can engage the cogged crown 4 when the latter is inserted into the region of the inner cogs.

The fastening of the connection hood 5 onto the drive shaft 1 takes place with the aid of a connection ring 15, which can be fixed by means of, for example, set screws 16, but which ring displays an inner opening that is larger than the region of the drive shaft 1 that lies in the region of this connection ring 15, as is clearly shown in FIG. 2. By means of this structure, a relative pendulum movement between the connection hood 5 and the drive shaft 1 is possible, which movement allows the plane of the cutting head disc to assume a slightly angular position relative to the axis of the drive shaft, and an optimal parallel arrangement of the cutting head disc with respect to the extrusion-nozzle plate is ensured.

Finally, a pressure transmission plate 10 is provided, which plate can be arranged inside the connection hood 5 and is produced as a separate component. This pressure transmission plate displays a semi-spherical recess 11 that can come into contact with the outer face of the ball 12 and is adapted to the shape and size of the ball. The ball 12 can consist here of carbide and the pressure transmission plate 10 of a material that can work together with the ball 12 in an optimal manner.

From this, it is evident that when wear between the ball 12 and the pressure transmission plate 10 occurs, an easy replacement of both components is possible, without thereby requiring special interventions on the drive shaft 1 or the connection hood 5.

This occurrences of wear in the region between ball 12 and pressure transmission plate 10 come about because the drive shaft 1 stresses the connection hood 5 not only in a rotational manner, but also puts pressure along the longitudinal axis of the latter, in order to press the connection hood 5 and the cutting head disc borne by the latter with the appropriate pressure against the counteredge or the extrusion nozzle plate, as the case may be.

What is claimed is:

1. Assembly of a drive shaft with the cutting head hub of a submersible granulator, which assembly comprises a connection hood that is attachable in a pivoting manner to the drive shaft, which hood displays at its outer end an outer threading for the cutting head hub to be screwed on by means of a corresponding inner threading, the drive shaft abutting the inner side of the connection hood with a spherical end, wherein the spherical end of the drive shaft is designed as a ball, wherein a contact pressure is applied to said spherical end of the drive shaft in a direction along the axis of said drive shaft, wherein a cogged crown having outer cogs is arranged at the cutting-head-side end of the drive shaft, wherein the connector hood has inner cogs that engage the outer cogs of said cogged crown, and the outer surface of each cog of said cogged crown is convexly curved.

2. Assembly according to claim 1, wherein the cog flanks of the cogs are curved around an axis that runs parallel to the longitudinal axis of the drive shaft.

3. Assembly according to claim 1, wherein a pressure transmission plate is arranged on the inner side of the connection hood, which plate displays at its center a semi-spherical recess adapted to the spherical end of the drive shaft.

4. Assembly according claim 1, wherein the ball is cemented to the drive shaft.

5. Assembly according to claim 1, wherein the ball consists of carbide.

* * * * *